Nov. 6, 1934.                J. R. WARNER                1,979,591
                              LUBRICATOR
                         Filed Jan. 18, 1928          3 Sheets-Sheet 3
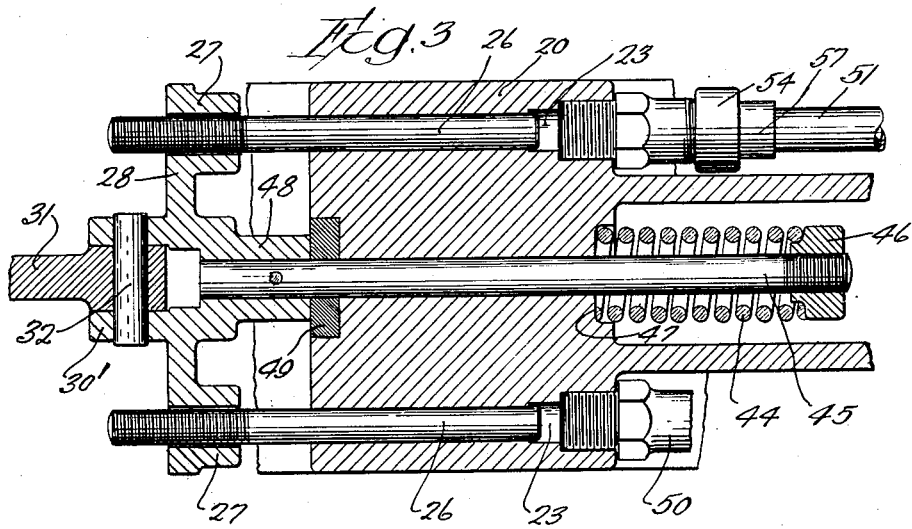
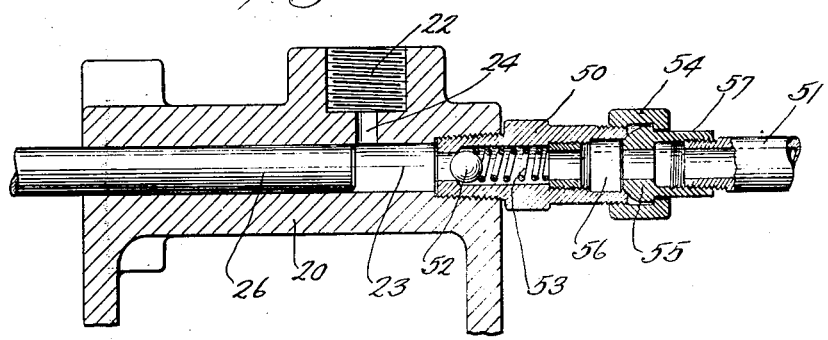
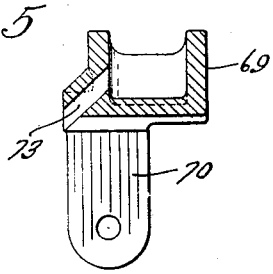
Inventor:
Joseph R. Warner
By Nissen & Crane Attys.

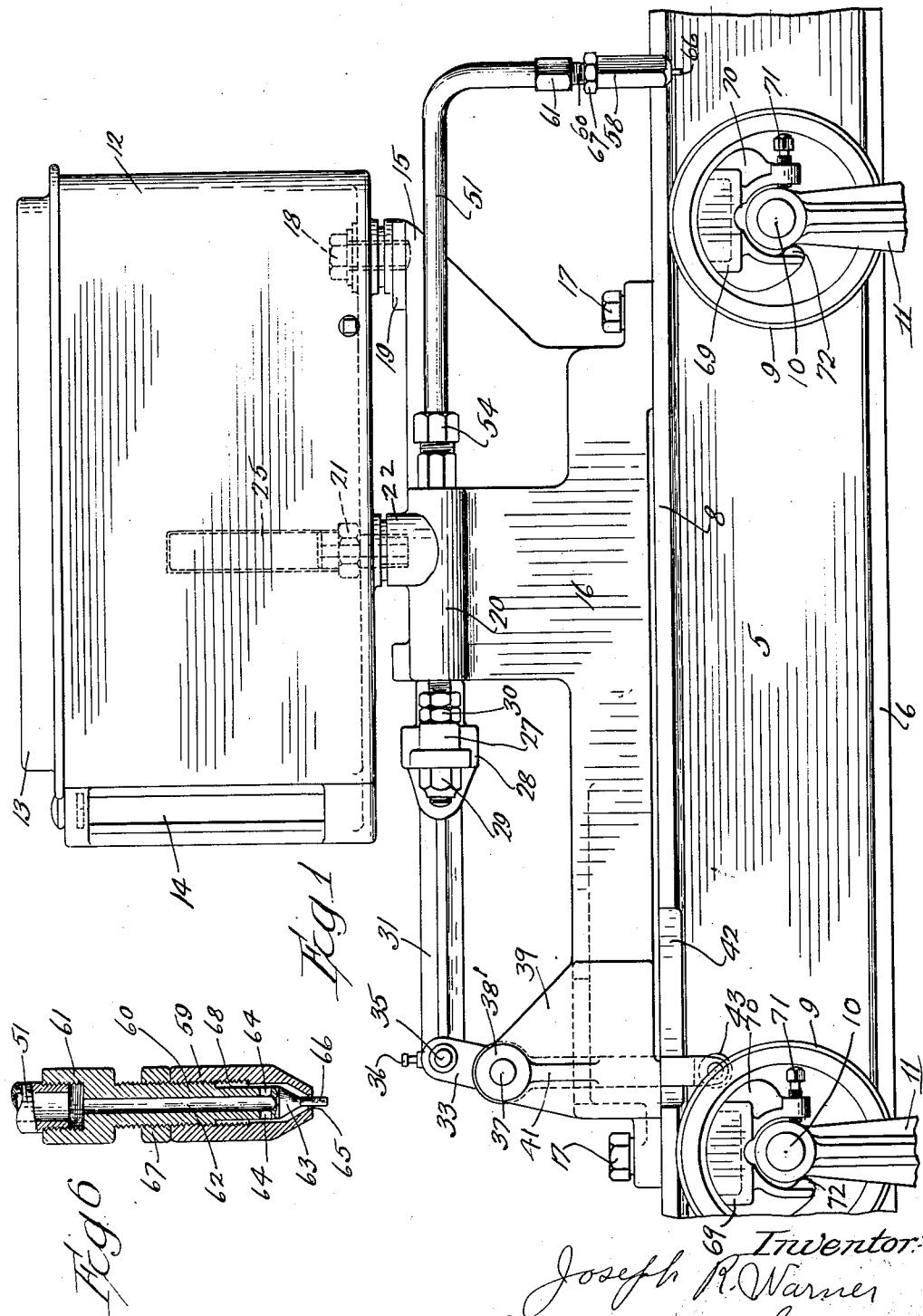

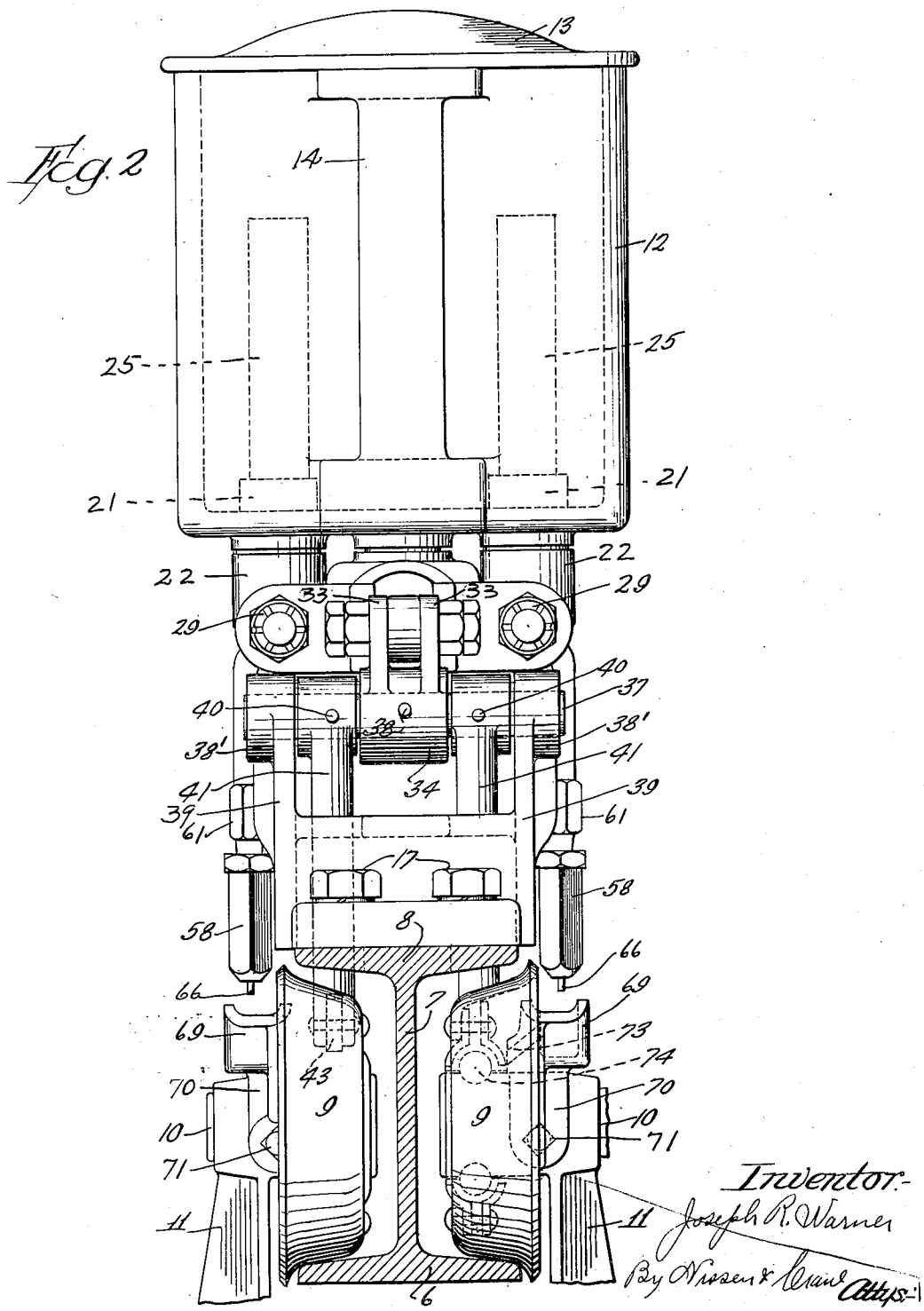

Patented Nov. 6, 1934

1,979,591

UNITED STATES PATENT OFFICE 1,979,591

LUBRICATOR

Joseph R. Warner, Fort Wayne, Ind., assignor to S. F. Bowser & Company, Inc., Fort Wayne, Ind., a corporation of Indiana Application January 18, 1928, Serial No. 247,587

9 Claims. (Cl. 184—15)

The present invention relates in general to lubricators and has for its primary object to provide a lubricator which is capable of delivering a lubricant at timed predetermined intervals for the purpose of lubricating certain parts of an apparatus or machine, which are caused to move from one location to another, during the operation of the machine or apparatus.

In its preferred form, the lubricator is especially adapted for use in connection with the lubrication of conveyer systems, especially the roller bearings of wheels of a conveyer chain, and, in this respect, the lubricator is constructed so as to deliver a quantity of the lubricant to the roller bearing oil cups of a conveyer chain as they pass a certain specified point.

Other objects of the invention will appear hereinafter, the novel features and combinations being set forth in the appended claims.

In the accompanying drawings:—

Fig. 1 is a view in side elevation of the lubricator illustrating the application of the same to a conveyer system;

Fig. 2 is a view in end elevation of the lubricator;

Fig. 3 is a horizontal section through the distributing cylinders of the lubricator;

Fig. 4 is a detail view in vertical section through one of the distributing cylinders and showing the check valve arrangement between the same and the distributing conduit;

Fig. 5 is a detail view in cross section of the lubricant cup carried by one of the conveyor rollers, the bearing of which is adapted to be supplied with lubricant; and Fig. 6 is a detail view in section of one of the distributing nozzles.

In illustrating the application of the invention to a conveyer system, I have shown only a portion of the conveyer system but that portion represents those parts of the system which are to be lubricated by the lubricator. In this connection, 5 represents an I-beam having a base 6, a connecting web 7, and a head 8. The flanges of the base on opposite sides of the connecting web 7 serve as tracks for the rollers 9. The axles 10 of the rollers suspend the arms 11 of the conveyer.

In the operation of the conveyer, the rollers 9 travel to the right, as viewed in Fig. 1, and the purpose of the invention is to provide means for supplying a lubricant to the roller bearing oil cups while the rollers are in motion; that is to say, while they are travelling on the track. The proper lubrication of the roller bearings, as they pass a certain specified point, resolves itself into a problem of positive timed lubrication. To accomplish this objective in an efficient and satisfactory manner, one of the important features of the invention, aside from those already mentioned, is the provision of means to automatically operate the lubricator at timed predetermined intervals by some part of the conveyer system, preferably the rollers or some member connected thereto. In this manner, the timing and positive operation of the lubricator is assured.

The lubricator, in its preferred form, comprises a lubricant container 12 which is adapted to be filled by removing the cover 13 thereof, and with a gauge 14 provided at a convenient location on one of the sides of the container for indicating the level of the lubricant.

The receptacle 12 is mounted directly upon the projecting end 15 of the base 16, the latter being, in turn, directly mounted upon the head 8 of the I-beam 5 by means of bolts, or the like, 17. The receptacle 12 is elevated slightly above the projecting end 15 of the base 16, and, since the connection between these parts is effected by a cap screw 18 which is threaded into the built-up support 19 and extends into the same from the interior of the receptacle, a tight joint must be made to prevent the leakage of lubricant. This may be accomplished by the use of washers on opposite sides of the bottom of the receptacle which fit around the cap screw in any suitable manner.

Intermediate the ends of the base 16 of the lubricator mounting is a distributing cylinder block 20, the same being supported beneath the bottom of the lubricant receptacle 12 and communicating with the interior thereof through a pair of threaded fittings 21 which extend through the bottom of the receptacle into the threaded collars 22 on opposite sides of the block 20. Each of these threaded collars 22 communicate with the horizontal bores 23 in the block 20 through the vertical ducts 24. A leak-proof fit is provided for the fittings 21 where they extend through the bottom of the lubricant receptacle, and an upstanding screen device 25 is provided for each of the fittings 21 so that the lubricant, as it is delivered into the horizontal bores 23 of the block 20, is properly screened.

The horizontal bores 23 of the block 20 are equipped with pistons 26 and the effective stroke of these pistons is long enough to cover and uncover the vertical ducts 24 so as to control the introduction of the lubricant into the horizontal bores 23. In advance of the vertical ducts 24, the bores 23 are enlarged otherwise the pistons 26 snugly fit the same throughout the length thereof.

The connected ends of the pistons project through the end of the block and into the sleeves 27 of the yoke 28 and the same are fixed to the yoke by lock nuts 29 threaded on the piston ends, on one side of the sleeves, and a pair of nuts 30 threaded on the pistons on opposite sides of the sleeves 27. The effective stroke of the pistons 26 may be regulated and adjusted by means of these nuts and, in this way, the effective stroke of the pistons past the vertical ducts 24 may be regulated for controlling the quantity of lubricant that is forced by the check valves 52 upon each stroke of the pistons.

It should be noted that the lubricant container 12 is mounted for support on the frame 16 above the distributing cylinder block 20 with the gauge 14 always in full view for observation of the depth of the lubricant in the lubricant container 12. Since the lubricant container 12 is secured at 18, 19 to the projecting end of the base 16 and also to the collars 22 on opposite sides of the block as shown in Fig. 2, the bottom of the receptacle is close to the block 20 and therefore the hydraulic head is reduced to a minimum. The plungers 26 are drawn to the left as shown in Fig. 3 when one of the wheels 9 engages the roller 43 as shown in Fig. 1. The check-valve will be automatically closed and the oil drawn into the cylinders 23 forcibly. When the arm 41 is released the spring 44 is free to act to move the plungers 26 toward the right and by reason of the openings 24 such movements of the plungers 26 toward the right can be exerted with comparative freedom, but as soon as the plungers 26 move past the openings 24 as shown in Fig. 4, a hammer-blow will be exerted by each of the plungers 26 on the confined lubricant which will suddenly open the check-valves 52 and for a brief period very forcibly throw a stream of oil from each of the nozzles 66 as shown in Fig. 2 into each of the cups 69 at the very time when such cups are under the nozzles and rapidly traveling along the track 6.

The yoke 28 intermediate the sleeves 27 is provided with a cross-head 30' for connecting a reciprocating link 31. This connection is made by a pin 32. The opposite end of the link 31 is pivoted between the ears 33 of the rocker sleeve 34 by means of the pin 35. This connection is equipped with an oiler 36 for lubricating the pin 35. The rocker sleeve 34 is fixed on the shaft 37 by means of a pin 38. The shaft 37 is trunnioned in the supporting bearings 38' on the upwardly extending arms 39 at the end of the lubricator base 16.

Also mounted in fixed relation to the shaft 37 by means of the pin 40 and extending downwardly therefrom on opposite sides of the web 7 of the I-beam 5 are a pair of trip levers 41. The flanges of the head 8 of the I-beam are recessed, as at 42, to accommodate the levers 41 so that the rollers 43 carried on their respective ends may be presented in front of the treads of the rollers 9.

It will thus be seen that as the rollers 9 travel the track on opposite sides of the I-beam, they will be moved against the levers 41, swinging them to the right, as viewed from Fig. 1. This movement on the part of the levers will, in turn, rotate the shaft 37 in a counter-clockwise direction, viewed from Fig. 1, rocking the sleeve 34 and imparting a pull to the link 31. This operation will withdraw the pistons 26 and uncover the vertical ports 24, and permit a quantity of the lubricant to be drawn into each of the horizontal bores 23.

The pull on the yoke 28 is made against the resistance of the coil spring 44 which is coiled around the rod 45 and confined between the nut 46 on the rod and the side of the block 20. A recess is provided, as at 47, in the side of the block for seating the spring. The rod 45 extends through the block 20 and is fixed in the head 48 of the yoke 28 intermediate the sleeves 27 and in alinement with the link 31. An abutment block or plate 49 is inset in the side of the block 20 for receiving the impact of the end of the head 48 when the spring 44 returns the parts to their normal inactive position after the rollers 9 have tripped the levers 41.

Threaded into the front of the block 20 in alinement with the horizontal bores 23 are the check valve fittings 50 for the distributing conduits 51. These check valves are of conventional construction having the customary ball valve 52 which is normally seated under the influence of the coil spring 53 and for opening and closing the bore through the fitting. The distributing conduits 51 are secured to the check valves, in any conventional manner suitable for the purpose, such, for instance, as the union 54 threaded onto the end of the check valve and holding the head 55 within the enlargement 56 of the fitting. The threaded ends of the conduits are threaded within the extension 57. In this way, a leak-proof connection may be made between the check valves and the distributing conduits.

For the particular purpose of the present embodiment of the invention, the distributing conduits 51 are extended in advance of the lubricator and turned downwardly with their ends each equipped with a delivery nozzle 58.

The detail construction of the preferred form of these delivery nozzles 58 is illustrated in Fig 6, the same comprising an elongated sleeve 59 internally threaded for accommodating the relatively long threaded stem 60 on the end of the cap 61 which is threaded to the end of the conduit. The stem 60 is made with an internal bore 62 which communicates with the conduit at one end, its opposite end terminating at the conical head 63 on the end of the stem. Radial ducts 64 in the stem continue the passage into the sleeve 59 and around the sides of the conical head 63 and out of the restricted opening 65 in the end of the sleeve 59. A pin 66 on the conical head 63 projects through the restricted opening 65, as shown. A jam nut 67 is threaded onto the stem 60 and is adapted to abut against the end of the sleeve 59 for holding an adjustment of the sleeve for regulating the size of the opening 65 to a desired degree. For a short length of the stem 60 commencing at the conical head 63, the diameter of the same is reduced so as to provide an annular space 68 between the stem and the bore of the sleeve.

Each of the distributing conduits extend along opposite sides of the lubricator so that the distributing nozzle 58 is presented on opposite sides of the track for the rollers 9 where the lubricant may be discharged into the lubricant cups 69 carried by each of the rollers. These lubricant cups may be filled with some absorbent material suitable for the purpose. These lubricant cups are made with inverted U-shaped mountings 70 to straddle the bearings of the rollers with set screws 71 holding the same in place on one side by bearing against the sleeves for the arms 11 and with the opposite side of the mounting provided with a boss 72 also bearing against the sleeve below the center thereof.

The cups are further made with downwardly slanting ducts 73 which terminate adjacent the roller bearing 74 of the rollers.

The excess lubricant absorbed by the material in the cups 69 will gravitate through the ducts 73 or be fed over the wicks to the roller bearings 74 and thus keep the rollers constantly lubricated without an excessive quantity of the lubricant being delivered to the bearings.

The timed operation of the lubricator is most important. All parts should be properly adjusted so that the operation of the lubricator will deliver a certain amount of the lubricant through the nozzles 58 at the time when the oil cups of each of the rollers are immediately beneath the nozzles. Taking the illustration shown to the best advantage in Fig. 1 as an example, when the right hand or forward rollers are immediately under the nozzles 58, the rear or left hand rollers will have tripped the levers 41 so that the pistons 26 will have delivered a charge of lubricant, so to speak, into the conduits 51, and, as a result, a quantity of the lubricant will have been delivered into the cups 69 through the nozzles 58. By the time the next set of rollers reach the nozzles 58, the succeeding set of rollers will be in position to complete the reciprocation of the pistons so that a quantity of lubricant will be delivered to the next set of cups presented beneath the nozzles.

The rollers 43 on the ends of the levers 41 ride over the crest of the treads of the rollers, and, by the time the rollers have passed the levers, that is to say, at the end of the tripping action, the preceding set of rollers will be immediately under the nozzles. The horizontally spaced relation of the rollers, of course, must be taken into account for effecting the proper timing of the operation of the lubricator, as will be apparent from the illustration in Fig. 1.

The construction of the nozzles 58 is such as to prevent the lubricant from dripping therefrom when there are no cups beneath the same to receive the lubricant, and, by regulating the stroke of the pistons, the amount of lubricant discharged at each operation may be so regulated that the absorbent material in the cups 69 may be kept saturated to a predetermined extent so that no excessive amount of the lubricant will be delivered through the conduits 73. In other words, the bearings for the rollers will only be supplied with as much lubricant as they can use, without waste.

All of these results are important since it is undesirable to have lubricant dripping over the conveyer belt, and, besides, it is wasteful. With the present invention, a saving in lubricant may be realized and there will be no lubricant distributed around on parts which are not intended to receive it.

Obviously those skilled in the art may make various changes in the construction and arrangement of parts without departing from the spirit and scope of the invention as defined by the claims hereto appended, and I wish therefore not to be restricted to the precise construction herein disclosed.

Having thus described and shown an embodiment of my invention, what I claim and desire to secure by Letters Patent of the United States, is:—

1. In a conveyer system having a track and rollers traveling on opposite sides of the track, the combination of a lubricator mounted upon the track, and comprising a lubricant container, means for delivering lubricant from said container through each of a pair of ducts and into each of a pair of plunger housings, spring-actuated plungers in said housings controlling the effective port area of said ducts, means for adjusting the stroke of said plungers for regulating the quantity of lubricant admitted to the plunger housings through said ducts, conduits connected to each of said plunger housings and extending on opposite sides of said track, discharge nozzles on the ends of said conduits, check valves in said conduits, oil cups on said rollers for catching the lubricant discharged from said nozzles, and trip levers connected to said plungers and extending into the path of said rollers, whereby the travel of the rollers will cock the plungers against the resistance of the spring thereof and later release the plungers to permit the same to force the lubricant contained in said plunger housings into the conduits and out of the discharge nozzles when the oil cups are beneath the nozzles.

2. A lubricator comprising a discharge nozzle, a conduit communicating therewith, a check-valve in said conduit, a spring-actuated plunger for forcing lubricant into said conduit and from said nozzle against the action of said check-valve, and a trip lever for actuating said plunger against the resistance of the spring thereof so that when the plunger is released the spring will actuate said plunger to effect delivery of lubricant past said check-valve to said nozzle.

3. A lubricator comprising a nozzle, a spring-actuated plunger for delivering lubricant to said discharge nozzle, a check-valve between said plunger and said discharge nozzle, means for adjusting the plunger for regulating the quantity of lubricant delivered to said nozzle, and means for cocking the plunger against the influence of said spring thereof and releasing the plunger to secure a quick actuation thereof by the spring thereof to effect delivery of the lubricant past said check-valve to said discharge nozzle for a brief period of time.

4. In automatic lubricating apparatus for conveyer systems, the combination with a track for a conveyer, of lubricating apparatus mounted in stationary position thereon and comprising a spring-actuated plunger connected to an elevated lubricant reservoir, tripping mechanism actuated by the conveyer traveling along said track to cock said spring-actuated plunger when drawing lubricant from said reservoir, a discharge nozzle connected to said lubricating apparatus, and a check-valve between said nozzle and said spring-actuated plunger adapted to open when the plunger is released and prevent flow of lubricant to said nozzle while the plunger is being cocked.

5. In lubricating apparatus for traveling mechanism, the combination with a track for the mechanism to be lubricated, of lubricating apparatus mounted thereon comprising a pump and an elevated reservoir connected thereto, tripping mechanism actuated by said traveling mechanism to operate said pump, a discharge nozzle in position to deliver lubricant at a predetermined period of said traveling mechanism, and a check-valve between said nozzle and said pump adapted to be opened only when said pump is delivering lubricant to said nozzle.

6. In a conveyer system, the combination with a track, of rollers traveling along said track, and means for lubricating the bearings of said rollers while moving along said track, said lubricating means comprising lubricant collecting devices associated with the rollers, a delivery nozzle, a cylinder connected to said nozzle, means for feeding said cylinder with lubricant, a plunger movable along said cylinder, tripping mechanism mounted for operation by said rollers, a spring connected to said tripping mechanism to be compressed thereby when operated by said rollers, and means connected between said spring and said plunger for moving the same along said cylinder to effect delivery of lubricant from said nozzle to said lubricant collecting devices after said spring has been released by said tripping mechanism.

7. In automatic lubricating mechanism for traveling mechanism, the combination with a support along which said mechanism is adapted to travel, of lubricating mechanism comprising a supporting frame mounted on said support, a lubricant tank mounted on said supporting frame, a horizontal cylinder mounted on said supporting frame and communicating on its upper side with said lubricant tank through a port in said cylinder, a lubricant delivery line connected with said cylinder, a plunger movable along said cylinder, and means extending into the path of said traveling mechanism for effecting the operation of said plunger to cause the same to move along said cylinder and close said port and then force lubricant through said lubricant delivery line to deliver a quantity at predetermined timed intervals to said traveling mechanism.

8. In lubricating apparatus for automatically delivering lubricant at timed intervals to traveling mechanism to be lubricated, the combination with a support along which said mechanism is adapted to travel, of a supporting frame mounted on said support, a lubricant tank mounted on said supporting frame, a horizontal cylinder having a port on its upper side communicating with said lubricant tank, a plunger movable in said cylinder, means actuated by such traveling mechanism for moving said plunger at timed intervals in a direction to draw lubricant from said tank through said port into said cylinder, means for delivering lubricant from said cylinder to the traveling mechanism to be lubricated, a check-valve in position to prevent flow of lubricant from said delivery means to said cylinder when the plunger draws lubricant from said tank, and a spring connected to said plunger for moving the same along said cylinder to force lubricant therefrom past said check-valve into said delivery means.

9. In a conveyor system having means forming a longitudinal track, a base mounted on the top of the track and comprising an upstanding block provided with three spaced-apart bores, the outermost bores having plunger pistons reciprocally mounted therein, the intermediate bore having a guide rod movable therein, a yoke mounted on the ends of the guide rod and having laterally extending arms connecting with the plunger rods, connections from the outermost portion of said block to conduits, each conduit having a nozzle on its outer end depending into the path of the track, a spring on the outer end of the intermediate guide rod, a lever on the opposite end of the intermediate guide rod, a substantially vertically disposed lever connected to the first mentioned lever, said last mentioned lever being pivoted about a horizontal axis on the base, the lower portion of said lever depending into the zone of action of the track, conveyors including rollers adapted to roll along said track, each roller having a bearing carrying an upstanding cup adapted to pass under the discharge nozzle, and said rollers adapted to make contact with the depending end of the second lever as they roll along the track, whereby to swing said second lever and to move the plunging piston and intermediate guide rod against the tension of the spring to cock the same so that upon further movement of the rollers the pistons will be reciprocated to cause the discharge of lubricant through said nozzles into the cup.

JOSEPH R. WARNER.